(12) United States Patent
Zu et al.

(10) Patent No.: US 11,467,864 B2
(45) Date of Patent: Oct. 11, 2022

(54) UNIFIED RESOURCE SCHEDULING COORDINATOR, METHOD FOR CREATING A VIRTUAL MACHINE AND/OR CONTAINER, AND UNIFIED RESOURCE SCHEDULING SYSTEM

(71) Applicant: CHINA UNIONPAY CO., LTD., Shanghai (CN)

(72) Inventors: Lijun Zu, Shanghai (CN); Mengdong Zhai, Shanghai (CN); Hang Yuan, Shanghai (CN); Zhihui Lv, Shanghai (CN); Jintan Wu, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 89 days.

(21) Appl. No.: 17/041,943

(22) PCT Filed: Jul. 5, 2019

(86) PCT No.: PCT/CN2019/094796
§ 371 (c)(1),
(2) Date: Sep. 25, 2020

(87) PCT Pub. No.: WO2020/103465
PCT Pub. Date: May 28, 2020

(65) Prior Publication Data
US 2021/0117220 A1      Apr. 22, 2021

(30) Foreign Application Priority Data

Nov. 23, 2018   (CN) .......................... 201811405694.1

(51) Int. Cl.
*G06F 9/455*      (2018.01)
*G06F 9/50*       (2006.01)

(52) U.S. Cl.
CPC ............ *G06F 9/45558* (2013.01); *G06F 9/50* (2013.01); *G06F 2009/45562* (2013.01); *G06F 2209/5011* (2013.01)

(58) Field of Classification Search
CPC ................... G06F 9/45558; G06F 9/50; G06F 2009/45562; G06F 2209/5011; G06F 9/5077; G06F 9/45533; G06F 9/4881
(Continued)

(56) References Cited

U.S. PATENT DOCUMENTS 9,367,340 B2    6/2016  Wang
10,534,629 B1 *  1/2020  St. Pierre .............. G06F 9/5055
(Continued)

FOREIGN PATENT DOCUMENTS

CN    103049334 A     4/2013
CN    102346684 B    12/2016
(Continued)

OTHER PUBLICATIONS

International Search Report dated Oct. 11, 2019 issued for International PCT Application No. PCT/CN2019/094796.
(Continued)

*Primary Examiner* — Kenneth Tang
(74) *Attorney, Agent, or Firm* — K&L Gates LLP

(57) ABSTRACT

A method for creating a virtual machine and/or a container through a unified resource scheduling coordinator, a unified resource scheduling coordinator, a unified resource scheduling system and a computer storage medium. The method includes: receiving an instruction to create the virtual machine and/or the container, wherein the instruction comprises parameters of the virtual machine and/or the container; selecting a first computing node from physical nodes according to the parameters; transmitting the parameters and information of the first computing node to a virtual machine
(Continued)

management module and/or a container management module depending on whether the virtual machine or the container is to be created; receiving resource allocation condition from the virtual machine management module and/or the container management module after creation of the virtual machine and/or the container; notifying the resource allocation condition to the container management module and/or the virtual machine management module after recording of resource change condition.

17 Claims, 11 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 10,673,714 | B1* | 6/2020 | Chitalia | ............... H04L 41/22 |
| 10,871,998 | B2* | 12/2020 | Parees | ................ G06F 9/505 |
| 2005/0022185 | A1 | 1/2005 | Romero | |
| 2016/0366233 | A1* | 12/2016 | Le | ............................. G06F 8/65 |
| 2018/0006025 | A1 | 1/2018 | Hook et al. | |
| 2019/0052549 | A1* | 2/2019 | Duggal | ............... H04L 41/5019 |
| 2020/0264934 | A1* | 8/2020 | Jayaraman | ............ G06F 9/5011 |
| 2020/0389372 | A1* | 12/2020 | Tian | ........................ H04L 65/40 |

FOREIGN PATENT DOCUMENTS

| | | | | |
|---|---|---|---|---|
| CN | 107277100 | A | | 10/2017 |
| CN | 107426034 | A | | 12/2017 |
| CN | 108595306 | A | | 9/2018 |
| CN | 109885377 | A | | 6/2019 |
| CN | 102027452 | A | | 5/2020 |
| CN | 106919445 | B | * | 8/2021 ............. G06F 9/485 |

OTHER PUBLICATIONS

Office Action dated Aug. 10, 2020 issued for corresponding Taiwan Application No. 108124482.
Office Action dated Mar. 12, 2021 issued for corresponding Indian Application No. 202017041276.

* cited by examiner

UNIFIED RESOURCE SCHEDULING COORDINATOR, METHOD FOR CREATING A VIRTUAL MACHINE AND/OR CONTAINER, AND UNIFIED RESOURCE SCHEDULING SYSTEM

CROSS-REFERENCE TO RELATED APPLICATION

The present application is a National Stage of International Application No. PCT/CN2019/094796 filed on Jul. 5, 2019, which claims priority to Chinese Patent Application No. 201811405694.1, filed on Nov. 23, 2018 and entitled "UNIFIED RESOURCE SCHEDULING COORDINATOR, METHOD FOR CREATING A VIRTUAL MACHINE AND/OR CONTAINER, AND UNIFIED RESOURCE SCHEDULING SYSTEM", which is incorporated herein by reference in its entirety.

TECHNICAL FIELD

The present disclosure relates to the technology of cloud computing, in particular, to a unified resource scheduling coordinator, a method for creating a virtual machine and/or container, a unified resource scheduling system, and a computer storage medium.

BACKGROUND

Cloud computing takes a pay-as-you-go model. This model provides available, convenient and on-demand network accesses to a configurable computing resource sharing pool including resources of networks, servers, storages, application software, and services. The resources can be provided quickly, requiring little management efforts or little interaction with service providers.

Virtualization is a major way for the cloud computing to construct a resource pool. The so-called virtualization is a technology that images, integrates, manages and redistributes computer hardware resources through software. Commonly used methods are virtual machine-based virtualization and container-based virtualization.

In an existing solution for deploying a virtual machine by a big data application, physical resource pools for a virtual machine and for a container are independent of each other and are separately scheduled. For example, the virtual machine is managed by OpenStack, while the container is managed by K8S, wherein the two open source platforms directly deploy and operate physical machines. In this way, the physical machine resource pools for the virtual machine and for the container cannot be reused, and there are cross-domain bottlenecks in network and storage sharing and management is also complicated. There is also an existing solution that proposes to use the container as a support for PaaS and runs the container in a virtual machine. In this existing solution, the physical resource pools for the virtual machine and for the container are still separately scheduled. For example, the virtual machine is managed by OpenStack, while and the container is managed by K8S, which leads to bottlenecks in network and storage sharing between the virtual machine and the container and complex management.

The above information disclosed in the section of BACKGROUND of the present disclosure is only intended to increase understanding of general background of the present disclosure, and should not be regarded as an acknowledgement or any form of suggestion that the information constitutes prior arts known to those skilled in the art.

SUMMARY

In view of this, according to one aspect of the present disclosure, there is provided a method for creating a virtual machine and/or a container through a unified resource scheduling coordinator. The method includes: receiving an instruction to create the virtual machine and/or the container, wherein the instruction includes parameters of the virtual machine and/or the container; selecting a first computing node from physical nodes according to the parameters; transmitting the parameters and information of the first computing node to a virtual machine management module and/or a container management module depending on whether the virtual machine or the container is to be created, such that the virtual machine management module allocates resources for the virtual machine through a virtual machine management agent module on the first computing node and/or such that the container management module to allocate resources for the container through a container management agent module on the first computing node; receiving resource allocation condition from the virtual machine management module and/or the container management module after creation of the virtual machine and/or the container; and notifying the resource allocation condition to the container management module and/or the virtual machine management module after recording of resource change condition.

By creating a virtual machine and/or container through the unified resource scheduling coordinator, the container and the virtual machine can be run on the same physical machine resource, making it possible to enable integrated scheduling and management.

In the above method, the parameters of the virtual machine and/or the container includes resource requirements and computing resource utilization mode of the virtual machine and/or the container.

In the above method, selecting the first computing node from physical nodes according to the parameters includes: using a nearest window query method to select the first computing node that meets the requirements according to the resource requirements and the computing resource utilization mode of the virtual machine and/or the container.

In the above method, using the nearest window query method to select the first computing node that meets the requirements according to the resource requirements and the computing resource usage modes of the virtual machine and/or the container includes: setting a list where each of the physical nodes has a unique number in the list, wherein the physical node includes one or more non-uniform memory access architecture NUMA nodes and available disk capacity, and the NUMA node includes information of computing resources available to the node; acquiring a current position $(i, i+k-1)$ of a window in the list, where $i$ represents a starting position number of the window, $k$ represents a length of the window, and $(i, i+k-1)$ represents a group of physical nodes within the window from a number $i$ to a number $i+k$; determining, with respect to physical nodes within the current position of the window, whether there is a node that meets the requirements of the container and/or the virtual machine for physical resources; returning a number $j$ of the node that meets the requirements and moving the window backward such that a new window becomes $(j+1, j+k)$ if the node exists; and moving the window backward such that the new window is $(i+k, i+2k-$ 1) and determining whether i is within the new window if the node does not exist, and determining that all of the nodes do not meet the requirements if i is within the new window.

Optionally, the method further includes: determining that a proportion of the number of NUMA nodes in a dedicated mode is higher than a first threshold and a utilization rate of the NUMA nodes is lower than a second threshold; randomly selecting a certain number of NUMA nodes from NUMA nodes in a shared mode; and modifying resource utilization mode of containers and/or virtual machines that are allocated with resources from selected NUMA nodes to be the dedicated mode and performing rescheduling, wherein a proportion of the number of the selected NUMA nodes with respect to all of the NUMA nodes corresponds to a third threshold.

In the above method, the first threshold, the second threshold, and the third threshold are all 50%.

Optionally, the method further includes: when no computing node that meets the requirements is found using the nearest window query method, traversing every computing node and statistically determining available resources of NUMA nodes in a dedicated mode on the computing node; allocating an appropriate computing node according to the requirements of the virtual machine and/or the container to be created; and performing rescheduling of resources on the appropriate computing node.

In the above method, the allocated resources comprises computing resources, network resources and storage resources.

According to another aspect of the present disclosure, a unified resource scheduling coordinator is provided. The unified resource scheduling coordinator includes: a first reception unit configured to receive an instruction to create a virtual machine and/or a container, wherein the instruction includes parameters of the virtual machine and/or the container; a selection unit configured to select a first computing node from physical nodes according to the parameters; a first transmission unit configured to transmit the parameters and information of the first computing node to a virtual machine management module and/or a container management module depending on whether the virtual machine or the container is to be created, such that the virtual machine management module allocates resources for the virtual machine through a virtual machine management agent module on the first computing node and/or such that the container management module to allocate resources for the container through a container management agent module on the first computing node; a second reception unit configured to receive resource allocation condition from the virtual machine management module and/or the container management module after creation of the virtual machine and/or the container; and a notification unit configured to notify the resource allocation condition to the container management module and/or the virtual machine management module after recording of resource change condition.

In the above unified resource scheduling coordinator, the parameters of the virtual machine and/or the container includes resource requirements and computing resource utilization mode of the virtual machine and/or the container.

In the above unified resource scheduling coordinator, the selection unit is configured to use a nearest window query method to select the first computing node that meets the requirements according to the resource requirements and the computing resource utilization mode of the virtual machine and/or the container.

In the above unified resource scheduling coordinator, the selection unit includes: a storage subunit configured to store a list where each of the physical nodes has a unique number in the list, wherein the physical node includes one or more non-uniform memory access architecture NUMA nodes and available disk capacity and the NUMA node includes information of computing resources available to the node, and to acquire a current position of (i, i+k−1) of a window in the list, wherein i represents a starting position number of the window, k represents a length of the window, and (i, i+k−1) represents a group of physical nodes within the window from a number i to a number i+k; a determination subunit configured to determine, with respect to physical nodes within the current position of the window, whether there is a node that meets the requirements of the container and/or the virtual machine for physical resources; and a processing subunit configured to return a number j of the node that meets the requirements and move the window backward such that a new window becomes (j+1, j+k) if the node exists, and move the window backward such that the new window is (i+k, i+2k−1) and determine whether i is in the new window if the node does not exist, and to determine that all of the nodes do not meet the requirements if i is within the new window.

Optionally, the unified resource scheduling coordinator further includes: a determination unit configured to determine that a proportion of the number of NUMA nodes in a dedicated mode is higher than a first threshold and a utilization rate of the NUMA nodes is lower than a second threshold; and a modification unit configured to randomly select a certain number of NUMA nodes from NUMA nodes in a shared mode, and modify resource utilization mode of containers and/or virtual machines that are allocated with resources from selected NUMA nodes to be the dedicated mode and perform rescheduling, wherein a proportion of the number of the selected NUMA nodes with respect to all of the NUMA nodes corresponds to a third threshold.

In the above unified resource scheduling coordinator, the first threshold, the second threshold, and the third threshold are all 50%.

Optionally, the unified resource scheduling coordinator further includes: a traversing and determination unit configured to traverse every computing node and statistically determine available resources of NUMA nodes in a dedicated mode on the computing node when no computing node that meets the requirements is found using the nearest window query method; an allocation unit configured to allocate an appropriate computing node according to the requirements of the virtual machine and/or the container to be created; and a scheduling unit configured to perform rescheduling of resources on the appropriate computing node.

In the above unified resource scheduling coordinator, the allocated resources comprises computing resources, network resources and storage resources.

According to another aspect of the present disclosure, a unified resource scheduling system is provided. The system includes the unified resource scheduling coordinator as described above.

Optionally, the system further includes: a container management module configured to allocate CPU and memory resources to the container.

Optionally, the system further includes: a container network proxy module configured to receive a network resource request from the container management module, modify a requested resource model from a container network model to a first network model, forward a modified network resource request including the first network model, and finally acquire network resources.

In the above system, the first network model is an Openstack neutron network model.

According to yet another aspect of the present disclosure, there is provided a computer storage medium, including instructions, which performs, when executed, the aforementioned methods.

The technical solutions of the present disclosure provide an integrated operation framework for container and virtual machine computing in a same physical resource pool, so that integrated operation of different computing powers can be realized through an automatic configuration of dynamic software and hardware environments. In addition, the technical solutions of the present disclosure allow network and storage to be under unified management and scheduling. For example, network resources for the container and for the virtual machine can be in a same network segment of a same tenant network, and the container and the virtual machine can share a same storage resource pool.

Through accompanying drawings incorporated herein and specific implementations used together with the accompanying drawings to illustrate certain principles of the present disclosure, other features and advantages of the methods and devices of the present disclosure will become clearer or clarified more specifically.

DETAILED DESCRIPTION

The following description describes specific embodiments of the present disclosure to teach those skilled in the art how to make and use the best mode of the present disclosure. In order to teach principles of the present disclosure, some conventional aspects have been simplified or omitted. Those skilled in the art should understand that variations derived from these embodiments also fall within the scope of the present disclosure. Those skilled in the art should understand that the following features can be combined in various ways to form multiple variations of the present disclosure. Therefore, the present disclosure is not limited to the following specific embodiments, but only by the claims and their equivalents.

In the context of the present disclosure, the term NUMA is an abbreviation of Non-Uniform Memory Access Architecture, that is, non-uniform memory access architecture. NUMA is a kind of memory designed for a multi-processor computer. The time required for a memory access depends on a location of a memory relative to a processor. Under NUMA, the processor can access its own local memory faster than a non-local memory (the memory is located in another processor, or is a memory shared between processors).

In the context of the present disclosure, the full name of REST is Representational State Transfer, which means representational state transfer in Chinese. REST refers to a set of architectural constraints and principles. If an architecture meets the constraints and principles of the REST, it is called as a RESTful architecture. Therefore, in the context of the present disclosure, a RESTful API means an application program interface that complies with the constraints and principles of the REST.

The inventors of the present disclosure discovered in works of deploying a virtual machine by a big data application that as developed application of the cloud computing technology, integrated scheduling of resource pools for containers, virtual machines and big data will become a trend. However, at present, financial institutions including UnionPay and other cloud service providers mainly take a deployment mode that deploys physical resource pools independently. That is, some physical machine resources are dedicated to virtual machines, some physical machines are dedicated to big data, and some physical machine resources are dedicated to containers, and it is impossible to achieve quick switch between different resource pools. With gradual maturity of the container technology, its application will also become more extensive, so integrated scheduling of resources of containers and virtual machines has become a primary technical difficulty.

Figure 1:
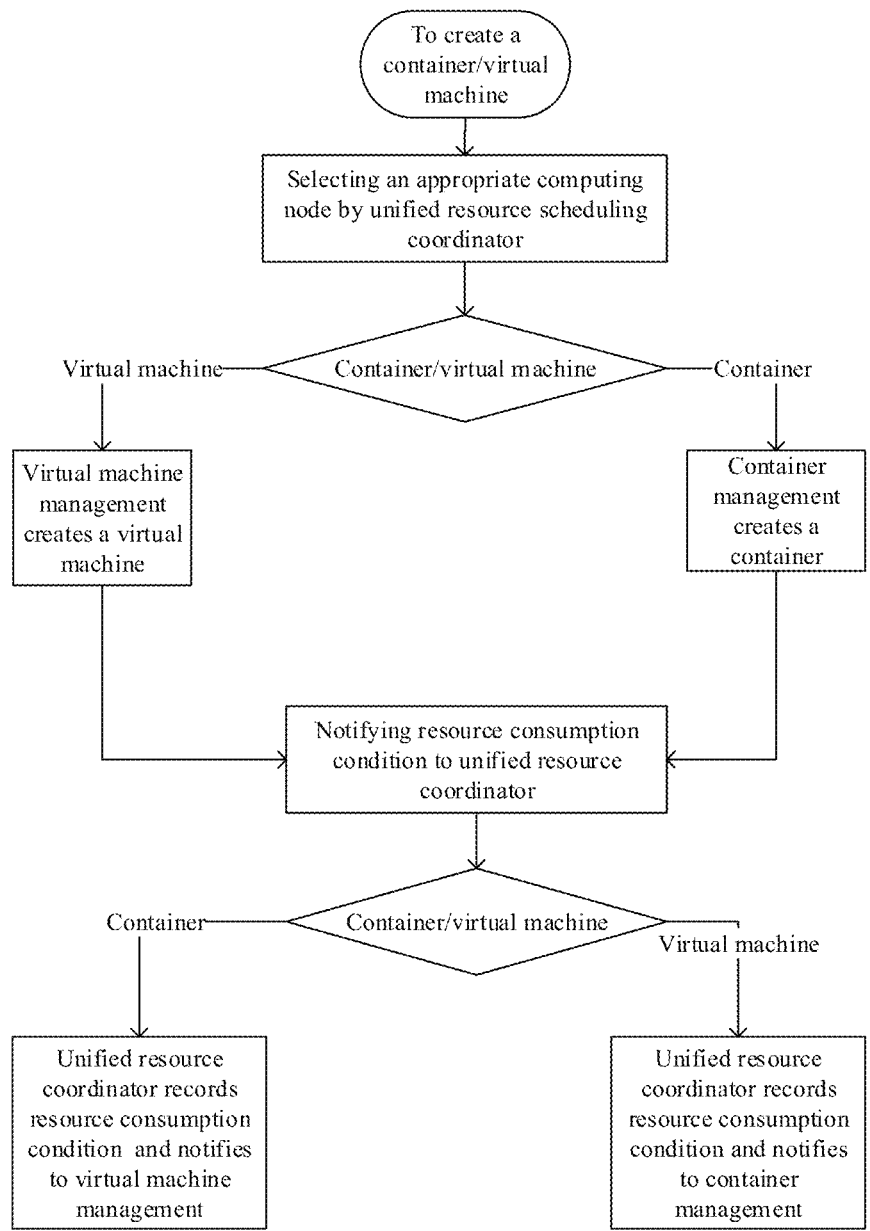
FIG. 1 is a flowchart showing a method for creating a container/virtual machine according to an embodiment of the present disclosure.

In view of this technical difficulty, according to an embodiment of the present disclosure, a method for creating a virtual machine and/or container through a unified resource scheduling coordinator is provided. As shown in FIG. 1, the method includes: receiving an instruction to create a virtual machine and/or a container, wherein the instruction includes parameters of the virtual machine and/or the container; selecting a first computing node from physical nodes according to the parameters; transmitting the parameters and information of the first computing node to a virtual machine management module and/or a container management module depending on a type of creation, such that the virtual machine management module allocates resources for the virtual machine through a virtual machine management agent module on the first computing node and/or such that the container management module to allocate resources for the container through a container management agent module on the first computing node; receiving resource allocation condition from the virtual machine management module and/or the container management module after creation of the virtual machine and/or the container; and notifying the resource allocation condition to the container management module and/or the virtual machine management module after recording of resource change condition.

Figure 2:
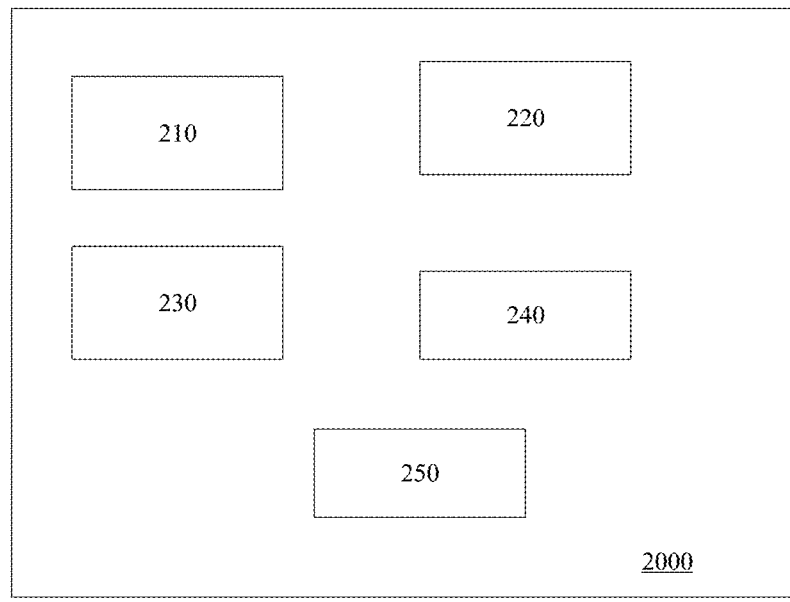
FIG. 2 is a structural diagram showing a unified resource scheduling coordinator according to an embodiment of the present disclosure.

FIG. 2 is a structural diagram showing a unified resource scheduling coordinator 2000 according to an embodiment of the present disclosure.

As shown in FIG. 2, the unified resource scheduling coordinator 2000 includes a first reception unit 210, a selection unit 220, a first transmission unit 230, a second reception unit 240, and a notification unit 250. The first reception unit 210 is configured to receive an instruction to create a virtual machine and/or a container, wherein the instruction includes parameters of the virtual machine and/or the container. The selection unit 220 is configured to select a first computing node from physical nodes according to the parameters. The first transmission unit 230 is configured to transmit the parameters and information of the first computing node to a virtual machine management module and/or a container management module depending on a type of creation, such that the virtual machine management module allocates resources for the virtual machine through a virtual machine management agent module on the first computing node and/or such that the container management module to allocate resources for the container through a container management agent module on the first computing node. The second reception unit 240 is configured to receive resource allocation condition from the virtual machine management module and/or the container management module after creation of the virtual machine and/or the container. The notification unit 250 is configured to notify the resource allocation condition to the container management module and/or the virtual machine management module after recording of resource change condition.

Figure 3:
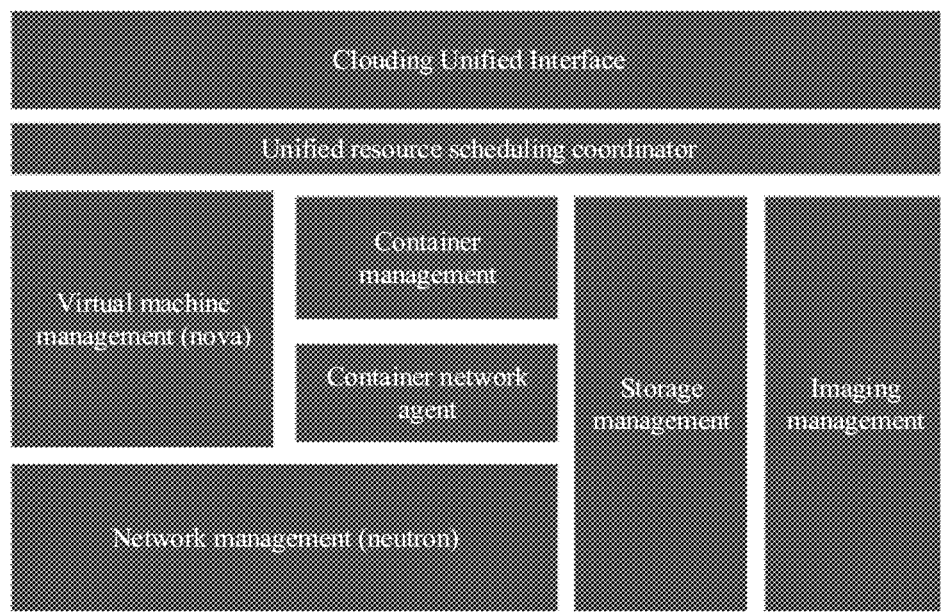
FIG. 3 shows a unified resource scheduling system according to an embodiment of the present disclosure.

FIG. 3 shows a unified resource scheduling system according to an embodiment of the present disclosure. As shown in FIG. 3, the unified resource scheduling system includes a cloud unified interface, a unified resource scheduling coordinator, a virtual machine management module, a container management module, a container network agent module, a storage management module, an imaging management module, and a network management module.

In an embodiment, the unified cloud interface is responsible for interfacing with a user and the unified resource scheduling coordinator. Before creation, the user specifies various parameters of the container/virtual machine through the unified cloud interface, including the number of CPUs, memory size, disk size, network access, imaging and computing resource utilization mode to be used, etc. After the user issues an instruction to create a container/virtual machine, the cloud unified interface encapsulates the parameters of the container/virtual machine in a Json format, and then invokes a RESTful API of the unified resource scheduling coordinator to transmit information of the container/virtual machine to the unified resource scheduling coordinator.

In an embodiment, the unified resource scheduling coordinator, after receiving a creation request, uses a scheduling algorithm to select a physical node that meets requirements of the container/virtual machine according to the requirements for resources and computing resource utilization mode of the container/virtual machine. If a container is to be created, the unified resource scheduling coordinator invokes a RESTful API of the container management module to transmit parameters of the container and information of the physical node to the container management module. If a virtual machine is to be created, the unified resource scheduling coordinator invokes a RESTful API of the virtual machine management module to transmit parameters of the virtual machine and information of the physical node to the virtual machine management module.

In an embodiment, the container management module, after receiving the creation request, acquires an image of the container from the imaging management module, acquires CPUs and memories on the physical node according to the computing resource utilization mode of the container, acquires storage resources through the storage management module or a docker driver, acquires network resources through the container network agent module, and finally completes creation of the container through the docker driver, and invokes the RESTful API of the unified resource scheduling coordinator to notify resource consumption condition to the unified resource scheduling coordinator.

In an embodiment, the container network proxy module converts requirements of the container for network resources into an OpenStack network resource request, transmits the request to the network management module, which in turn allocates network resources, such as IP address, MAC address and port, etc. from a network resource pool according to the request, and returns allocated resources to the container network agent module. After receiving information of resources, the container network agent module returns a result of network resource allocation to the container management module.

In an embodiment, the virtual machine management module, after receiving the creation request, acquires an image of the virtual machine from the imaging management module, acquires CPUs and memories on the physical node according to the computing resource utilization mode of the virtual machine, acquires storage resources through the storage management module or a libvirt driver, acquires network resources through the network management module, and finally complete creation of the virtual machine through the libvirt driver, and invokes the RESTful API of the unified resource scheduling coordinator to notify resource consumption condition to the unified resource scheduling coordinator.

In an embodiment, there are two methods for the container management module/virtual machine management module to acquire storage resources. One is to acquire storage resources on the physical node, that is, local storage resources. The container management module and the virtual machine management module respectively uses the docker driver and the libvirt driver to acquire the local storage resources. In this case, when the container management module/virtual machine management module notifies the resource consumption condition to the unified resource scheduling coordinator, it should include storage resource consumption condition. The other is that the container management module/virtual machine management module acquires storage resources through the storage management module. As an example, the storage management module may be an OpenStack Cinder, and the container management module/virtual machine management module acquires distributed storage resources by invoking the Cinder's RESTful API. In this case, it is the Cinder that notifies the storage resource consumption condition to the unified resource scheduling coordinator.

It should be pointed out that those skilled in the art can easily understand that storage scheduling of storage resources can be performed without the Cinder. For example, by mounting a local directory for the container and recording and managing the local directory by the unified resource scheduling coordinator, unified scheduling of storage resources can also be realized.

In an embodiment, the unified resource scheduling coordinator, after receiving resource consumption information transmitted from the container management module, updates information of resources in the resource pool, and notifies resource consumption condition of the container to the virtual machine management module. The virtual machine management module, after receiving the information, records the resource consumption condition. Similarly, the unified resource scheduling coordinator, after receiving resource consumption information transmitted from the virtual machine management module, updates information of resources in the resource pool, and notifies resource consumption condition of the virtual machine to the container management module. The container management module, after receiving the information, records the resource consumption condition.

In an embodiment, when a container and a virtual machine are deleted, the unified resource scheduling coordinator recycles resources occupied by the container and the virtual machine. That is, the resource allocation is opposite to that in the creation process, and the resource change condition should also be notified to the unified resource scheduling coordinator.

In an embodiment, the steps of creating a container/virtual machine using a unified resource scheduling system are provided as follows.

Firstly, the cloud unified interface transmits the parameters encapsulated in Json format to the unified resource scheduling coordinator by invoking a RESTful API of the unified resource scheduling coordinator to complete transmission of a container/virtual machine creation instruction.

Secondly, after receiving the creation instruction, the unified resource scheduling coordinator uses a nearest window query method to select a computing node that meets requirements according to a type of resource allocation.

Next, the unified resource scheduling coordinator determines a type of the creation. If a container is to be created, it encapsulates parameters for the creation as Json and invokes a RESTful API of the container management module to transmit to the container management module. If a virtual machine is to be created, it encapsulates parameters for the creation as Json and invokes a RESTful API of the virtual machine management module to transmit to the virtual machine management module.

Then, after receiving the creation request, the container management module forwards the request to the container management agent module on the computing node selected in step S2 through a RPC technology. The container management agent module allocates computing resources for the container, including CPUs and memories, and acquires network resources through the container network agent module and disk resources through the storage management module, and finally completes creation of the container.

In an embodiment, the container management module may be OpenStack Zun. After receiving the creation request, the virtual machine management module forwards the request to the virtual machine management agent module on the selected computing node through a RPC technology, and the virtual machine management agent module allocates computing resources for the virtual machine, including CPUs and memories, acquires network resources through the network management module and disk resources through the storage management module, and finally completes creation of the virtual machine. In an embodiment, the virtual machine management module is OpenStack Nova, the container network agent module is OpenStack kuryr, the network management module is OpenStack neutron, and the storage management module is OpenStack Cinder.

Finally, after completion of creation of the container, the container management module encapsulates resource allocation condition in a Json format and then notifies the unified resource scheduling coordinator by invoking the RESTful API of the unified resource scheduling coordinator. The unified resource scheduling coordinator records resource change condition and then invokes the RESTful API of the virtual machine management module to notify resource utilization condition to the virtual machine management module. The virtual machine management module encapsulates resource allocation condition in a Json format after completing creation of the virtual machine, and then notifies the unified resource scheduling coordinator by invoking the RESTful API of the unified resource scheduling coordinator. The unified resource scheduling coordinator records resource change condition and then invokes the RESTful API of the container management module to notify resource utilization condition to the container management module.

Figure 4:
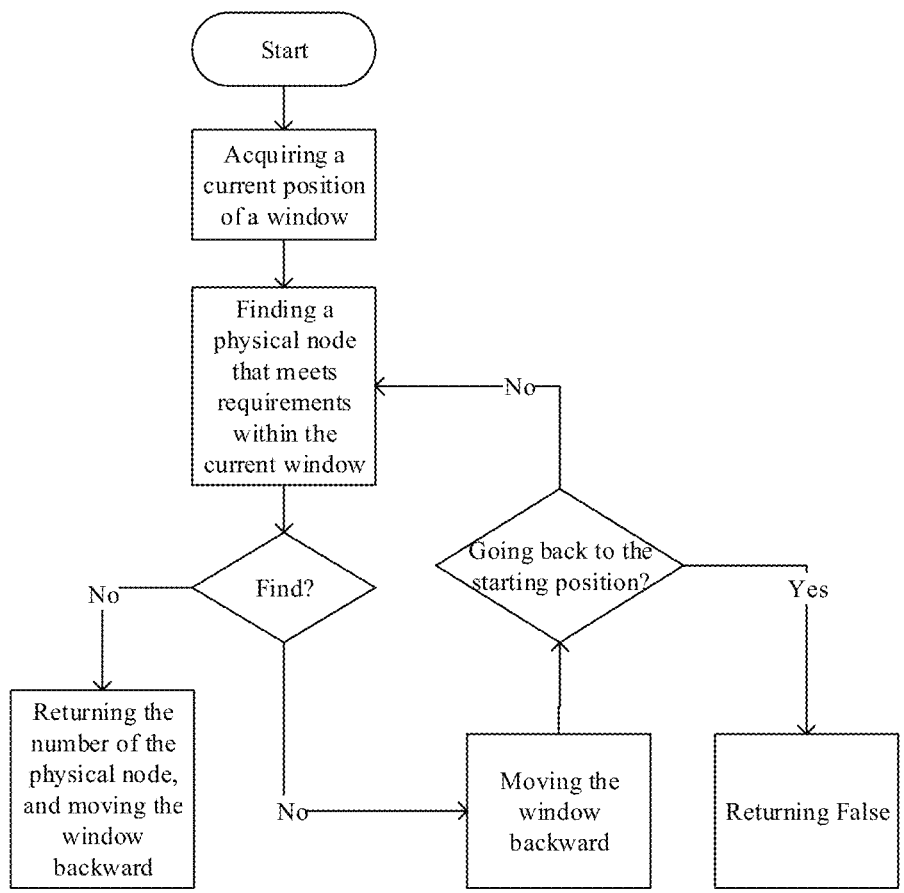
FIG. 4 is a flowchart showing a nearby window query method according to an embodiment of the present disclosure.

FIG. 4 is a flowchart showing a nearby window query method according to an embodiment of the present disclosure. Physical nodes are stored in a form of a linear list. Each physical node has a unique number in the list. The physical node includes one or more NUMA nodes and available disk capacity. The NUMA node includes information of computing resources such as the number of CPUs and memories or the like available for the node. As shown in FIG. 4, the nearest window query method includes the following steps.

S1: The unified resource scheduling coordinator acquires a current position of a window (i, i+k−1), wherein i represents a starting window position number, k represents a window length, and (i, i+k−1) represents a group of physical nodes from a window number i to a window number i+k.

S2: it is determined, with respect to physical nodes within the window, whether a commuting node meeting requirements of the container/virtual machine for physical resources exists.

If the computing node exists, the method goes to step S3, and if the computing node does not exist, the method goes to step S4.

S3: A number j of the computing node that meets the requirements is returned, and the window is moved backward such that a new window becomes (j+1, j+k).

S4: The window is moved backward such that the new window is (i+k, i+2k−1), and it is determined whether i is within the window. If i is within the window, all of the nodes do not meet the requirements, and False is returned; and if i is not within the window, S2 is performed.

Figure 5:
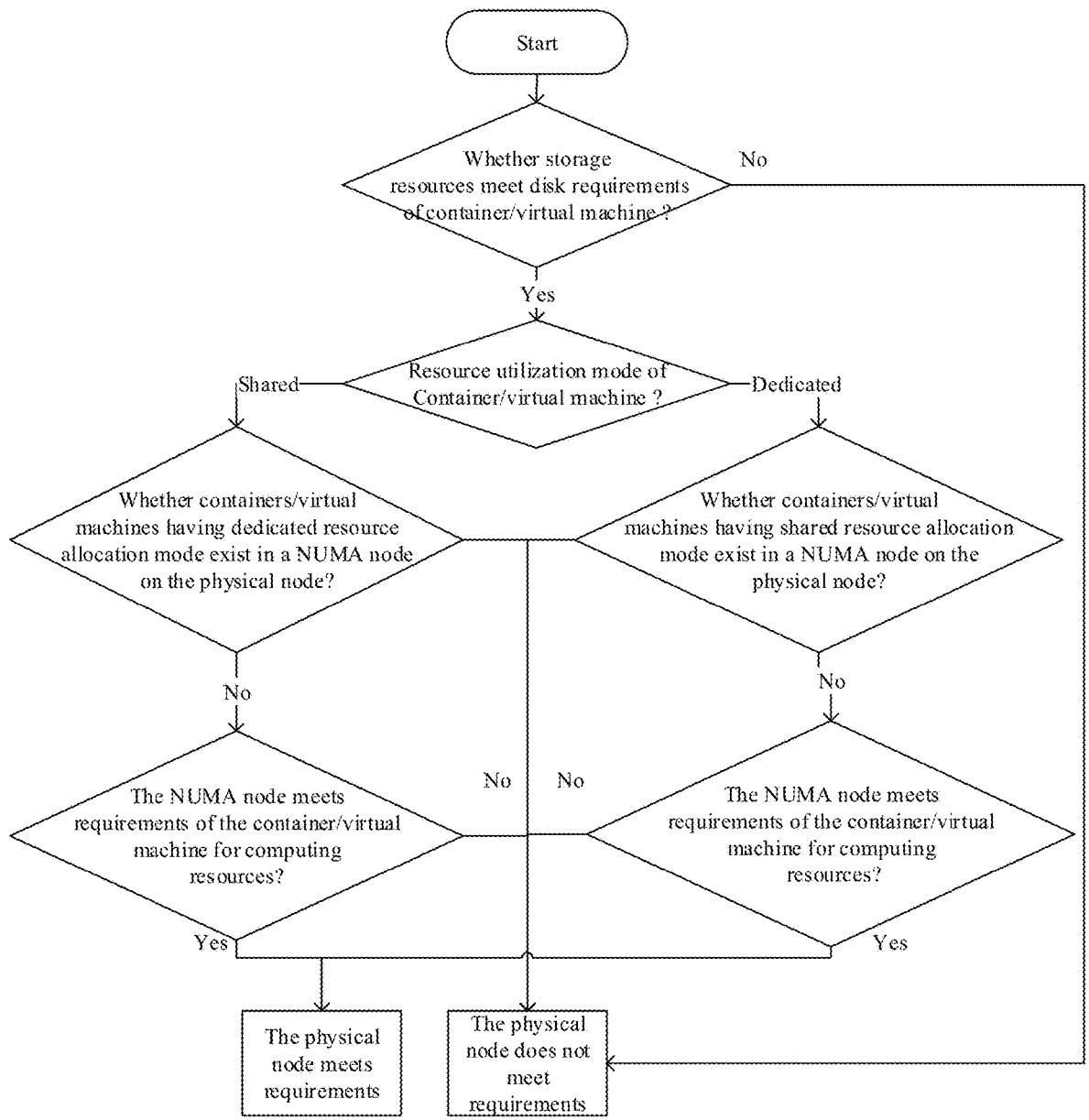
FIG. 5 is a flowchart showing a method for determining whether a physical node meets requirements according to an embodiment of the present disclosure.

FIG. 5 shows steps of a method for determining whether a physical node meets the requirements in the nearby window query method of FIG. 4. Details are provided as follows.

S1: It is determined whether disk resources required by the container/virtual machine can be satisfied. If the container/virtual machine requires a local disk, it is determined whether available disk space on the physical node is sufficient. If the container/virtual machine requires distributed storage resources, then OpenStack Cinder's RESTful API is invoked to determine whether distributed storage resources are sufficient. If the disk resources required by the container/virtual machine can be satisfied, then the method goes to step S2, otherwise returns False.

S2: The utilization mode of the container/virtual machine for computing resources is determined. There are two ways to use computing resources by the container/virtual machine, and one is a shared mode and the other is a dedicated mode. If the utilization mode is the shared mode, the method goes to step S3, and if the utilization mode is the dedicated mode, goes to step S6.

S3: In the shared mode, CPUs can be over-allocated. If there is a NUMA node at the physical node and containers/virtual machines that are being allocated with resources from this NUMA node utilize resources in a shared manner, the method goes to step S4, otherwise returns False.

S4: If the type of the creation refers to a virtual machine, for each of NUMA nodes on the physical node described in step S3, it is determined whether total CPU and available memory of the NUMA node meets the requirements of the virtual machine. If the requirements are met, the method returns True, otherwise returns False. If the type of the creation refers to a container, for each of the NUMA nodes on the physical node described in step S3, it is determined whether a sum of CPU and available memory of the NUMA node meets the requirements of the container. If the requirements are met, the method returns True, otherwise returns False. There is a special case for the container, that is, if the container does not have CPU or memory requirements, the method goes to step S5 in this case.

S5: All NUMA nodes on the physical node are traversed. If there is a NUMA node, from which containers are being allocated with resources have no CPU or memory requirements and there is no virtual machine that is allocated resources from the NUMA node, then the method returns True, otherwise returns False.

S6: In the dedicated mode, CPUs cannot be over-allocated. If there is a NUMA node, on the physical node, from which containers/virtual machines that are being allocated with resources utilize resources in a dedicated mode, the method goes to step S7, otherwise returns False.

S7: It is determined whether available CPU and memory on the NUMA node described in S6 are greater than the requirements of the container/virtual machine. If it is, the method returns True, otherwise returns False.

Figure 6:
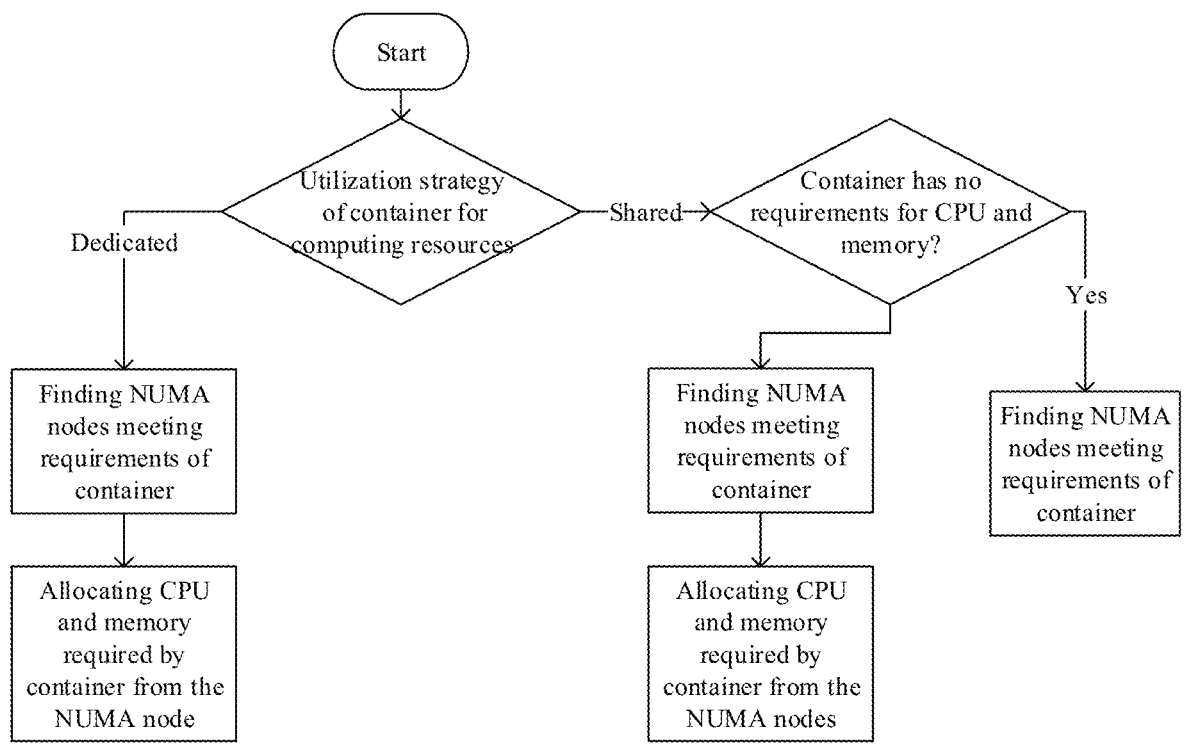
FIG. 6 is a flowchart showing a method for allocating by a container management module CPUs and memories for a container according to an embodiment of the present disclosure.

FIG. 6 shows steps of a method for allocating by the container management module CPUs and memories for a container in the container/virtual machine creation step. Details are provided as follows.

S1: Utilization strategy of the container for computing resources is determined. If it is a dedicated mode, the method goes to step S2, and if it is a shared mode, the method goes to step S3.

S2: On the physical node, a NUMA node described in step S6 of determining whether the physical node meets the requirements is found. Since the container requires i vcpus and kG memory, so i vcpus are randomly selected from available CPU numbers of the NUMA node and kG memory is selected from available memory of the NUMA node, and the i vcpus and the kG memory are assigned to the container by invoking the docker API.

S3: It is determined whether the container has no requirements for CPU or memory. If yes, the method goes to step S4, otherwise goes to step S5.

S4: On the physical node, a NUMA node described in step S3 of determining whether the physical node meets the requirements is found. Since the container requires i vcpus and kG memory, so i vcpus are randomly selected from available CPU numbers of the NUMA node and kG memory is selected from available memory of the NUMA node, and the i vcpus and the kG memory are assigned to the container by invoking the docker API.

S5: The docker API is directly invoked to create the container without specifying specific CPU and memory conditions.

Figure 7:
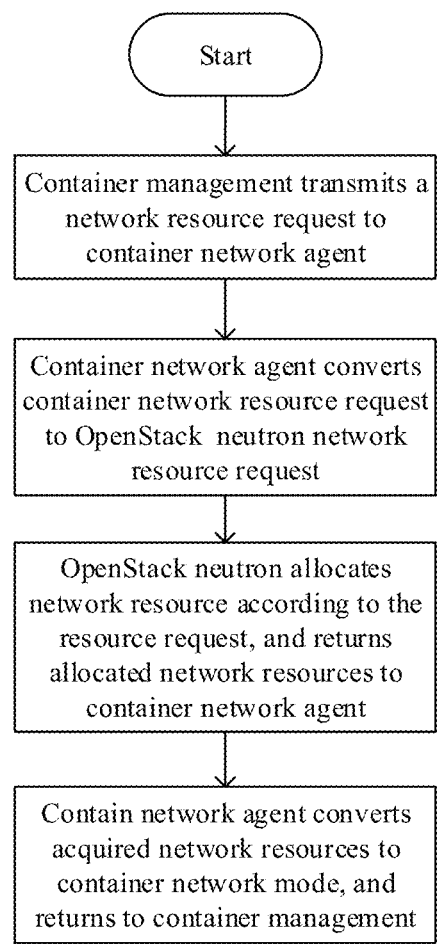
FIG. 7 is a flowchart showing a method for acquiring network resources by a container network proxy module according to an embodiment of the present disclosure.

FIG. 7 shows steps of a method for acquiring network resources through the container network proxy module in the container/virtual machine creation step. Details as provided follows.

S1: The container management module encapsulates a network resources request of the container, including parameters such as subnet, IP address, and MAC address or the like as Json and transmits to the container network proxy module through a RPC technology.

S2: After receiving the network resource request from the container management module, the container network proxy module converts a resource model of the request from a container network model to an OpenStack neutron network model, and transmits converted network resource request to the network management module through a RESTful API of the network management module.

S3: After receiving the network resource request, the network management module allocates available network resources from the network resource pool, such as IP address, MAC address, etc., generates corresponding virtual network devices, such as veth pair, etc., and returns a result of resource allocation to the container network proxy module.

S4: After receiving resource information returned by the network management module neutron, the container network agent module converts the resource information into the container network model, and returns converted information to the container management module.

Figure 8:
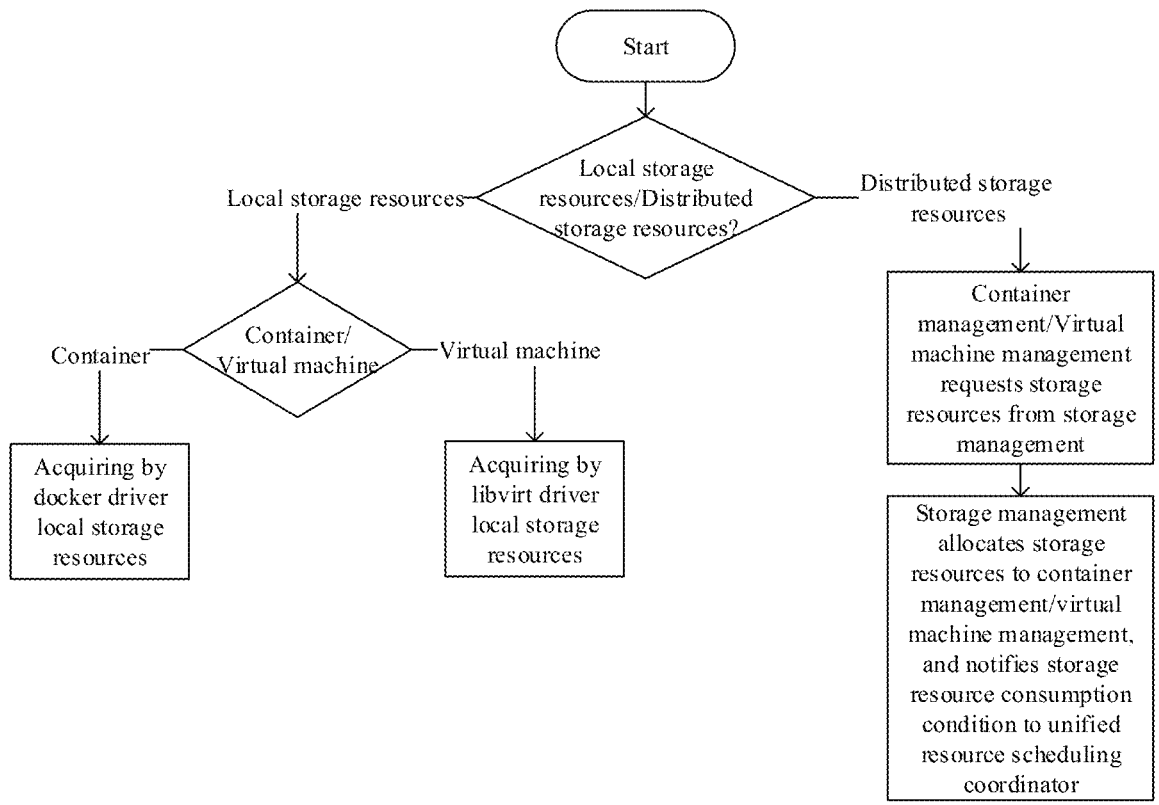
FIG. 8 is a flowchart showing a method for acquiring disk resources by a storage management module according to an embodiment of the present disclosure.

FIG. 8 shows steps of a method for acquiring disk resources through the storage management module in the container/virtual machine creation step. Details as provided as follows.

S1: it is determined whether the container/virtual machine requires local storage resources or distributed storage resources. If local storage resources are required, the method goes to step S2, and if distributed storage resources are required, the method goes to S5.

S2: it is determined whether it is a container or a virtual machine requesting storage resources. If it is a container, the method goes to step S3, and if it is a virtual machine, the method goes to step S4.

S3: The container management module invokes the docker driver to acquire local storage resources, and includes storage resource consumption information to resource consumption information to be transmitted to the unified resource scheduling coordinator.

S4: The virtual machine management module invokes the libvirt driver to acquire local storage resources, and include storage resource consumption information to resource consumption information to be transmitted to the unified resource scheduling coordinator.

S5: The container management module/virtual machine management module encapsulates the storage resource request into Json, and transmits it to the storage management module by invoking a RESTful API of the storage management module. The storage management module allocates resources from a distributed storage resource pool according to the resource request, and transmits allocation information to the container management module/virtual machine management module. In addition, storage resource consumption condition is also notified to the unified resource scheduling coordinator.

Figure 9:
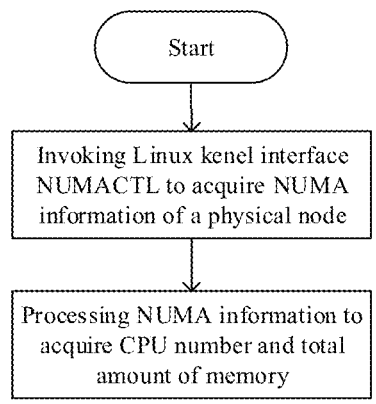
FIG. 9 is a flowchart showing a method for acquiring by a container a NUMA topology of a physical node according to an embodiment of the present disclosure.

FIG. 9 shows steps of a method for acquiring by a container a NUMA topology of a physical node. Details are provided as follows.

S1: A Linux kernel interface, numactl, is invoked to acquire NUMA information of the physical node.

S2: A NUMA topology model is constructed. The NUMA topology model is represented by a key-value structure. The NUMA topology includes a plurality of NUMA nodes, and the NUMA node model adopts a key-value structure, including CPU numbers, used CPU numbers, total amount of memory, and amount of available memory.

S3: CPU numbers and total amount of memory of the NUMA nodes are obtained from the NUMA information, to complete assignment of variables of the NUMA topology. Used CPU numbers are initially null, and amount of available memory is initially equal to total amount of memory.

Figure 10:
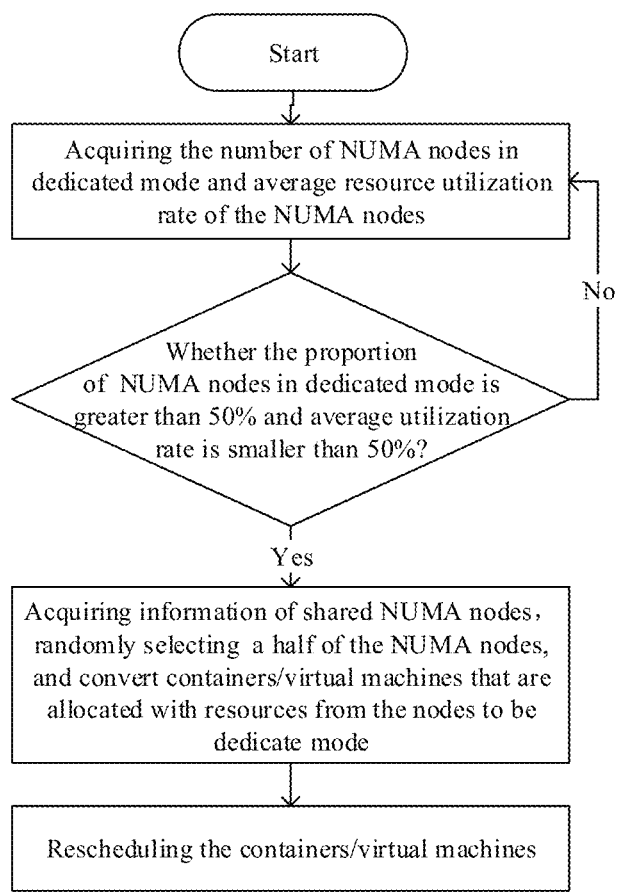
FIG. 10 is a flowchart showing a method for reducing excessive resource fragmentation caused by dedicated resource allocation according to an embodiment of the present disclosure.

FIG. 10 shows steps of a method for reducing by the unified resource scheduling system excessive resource fragmentation due to dedicated resource allocation. Details are provided as follows.

S1: All NUMA nodes are traversed, and the number i of NUMA nodes that allocate computing resources for containers/virtual machines in a dedicated mode is statistically determined. The total number of NUMA nodes is sum, so a proportion of the NUMA nodes in the dedicated mode is i/sum. For each NUMA node, the number of available CPUs is $i_{cpu}$, and the total number of CPUs is $sum_{cpu}$, the amount of available memories is $i_{mem}$, the total amount of memories is $sum_{mem}$, and a utilization rate of the NUMA node is thus $(i_{cpu}/sum_{cpu}+i_{mem}/sum_{mem})/2$.

S2: it is determined whether the proportion of the NUMA nodes in the dedicated mode is higher than 50% and the utilization rate of the NUMA node is lower than 50%. If it is, the method goes to step S3, otherwise goes to step S1.

S3: All NUMA nodes are traversed to find all NUMA nodes that allocate computing resources to containers/virtual machines in a shared mode, so as to form a NUMA node list. A half of the NUMA nodes are selected randomly, and containers/virtual machines that are allocated with computing resources from these NUMA nodes are traversed to modify resource utilization mode of each of the containers/virtual machines to be dedicated, and then the unified resource scheduling coordinator performs rescheduling.

Figure 11:
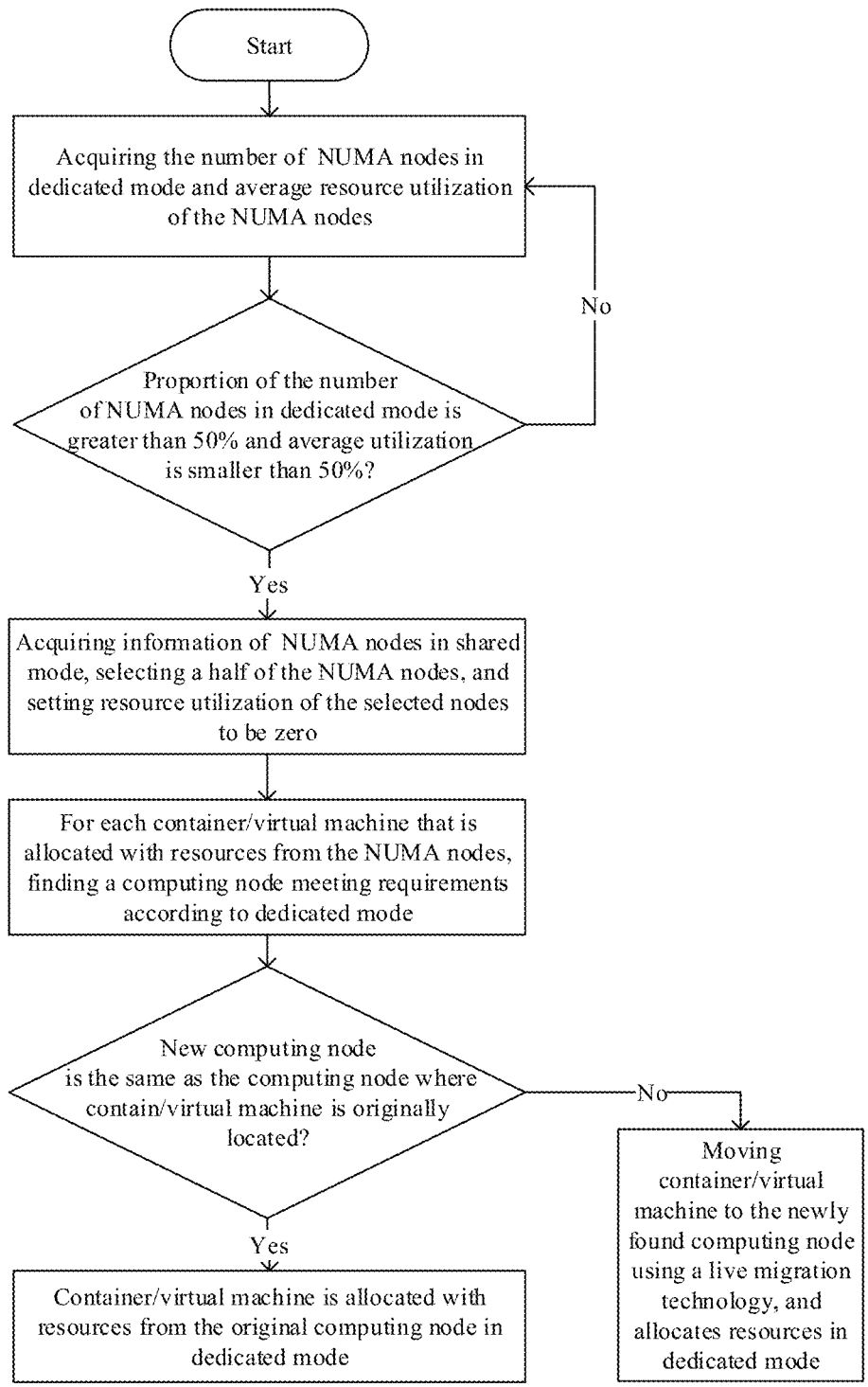
FIG. 11 is a flowchart showing a method for reducing excessive resource fragmentation caused by dedicated resource allocation according to an embodiment of the present disclosure.

FIG. 11 is a flowchart showing a method for reducing excessive resource fragmentation caused by dedicated resource allocation according to an embodiment of the present disclosure. Details are provided as follows.

S1: All NUMA nodes are traversed, and the number i of NUMA nodes that allocate computing resources for containers/virtual machines in the dedicated mode. The total number of NUMA nodes is sum, so a proportion of the NUMA nodes in the dedicated mode is i/sum. For each of the NUMA nodes, the number of available CPUs is $i_{cpu}$, the total number of CPUs is $sum_{cpu}$, the amount of available memories is $i_{mem}$, the total amount of memories is $sum_{mem}$, and a utilization rate of the NUMA node is thus $(i_{cpu}/sum_{cpu}+i_{mem}/sum_{mem})/2$.

S2: It is determined whether the proportion of the number of NUMA nodes in the dedicated mode is higher than 50% and the utilization rate of NUMA node is lower than 50%. If it is, the method goes to step S3, otherwise the method goes to step S1.

S3: All NUMA nodes are traversed to find all NUMA nodes that allocate computing resources to containers/virtual machines in the shared mode so as to form a NUMA node list. A half of the NUMA nodes are selected randomly, and containers/virtual machines that are allocated with resources from these NUMA nodes are traversed to find, for each of the container/virtual machine, a computing node that meets requirements from the computing nodes according to the dedicated mode. It is determined whether the newly found computing node and the computing node where the container/virtual machine was originally located are the same, and if so, the method goes to S4, otherwise goes to S5.

S4: The container/virtual machine is allocated with resources from the original computing node in the dedicated mode.

S5: The container/virtual machine is migrated from the original computing node to the newly found computing node using a live migration technology, and is allocated with resources in the dedicated mode.

Figure 12:
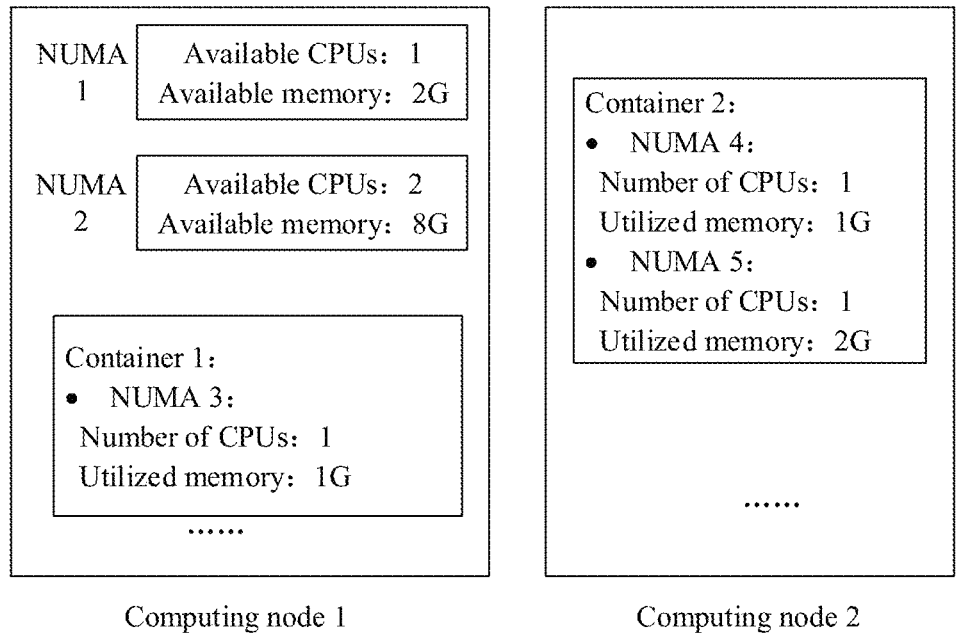
FIG. 12 to FIG. 13 are schematic diagrams of environments before and after rescheduling of resources using the method shown in FIG. 11 respectively.

For example, referring to FIG. 12, assuming that the cloud platform has satisfied the condition that the proportion of NUMA nodes in the dedicated mode is greater than 50% and the average utilization rate is smaller than 50%. For the case, NUAM node 1 and NUMA node 2 on the computing node 1 are two NUMA nodes in the dedicated mode. Available CPUs on NUMA node 1 is 1 and available memory is 2G, and available CPUs on NUMA node 2 is 2 and available memory is 8G. There is a container 1 in the shared mode on the compute node 1, which is using 1 CPU and 1G of memory on NUMA node 3. There is a container 2 in the shared mode on the compute node 2, which is using 1 CPU and 1G of memory on NUMA node 4, and 1 CPU and 2G of memory on NUMA node 5.

In the working process, firstly the container 1 is modified to the dedicated mode. All NUMA nodes in the dedicated mode are traversed by the nearest window query method and it is found that NUMA node 1 on the computing node 1 meets the requirements of the container 1, so the container 1 is allocated with resources from NUMA node 1 and resources from NUMA node 3 are recycled. Then, the container 2 is modified to the dedicated mode. All NUMA nodes in the dedicated mode are traversed by the nearest window query method and it is found that NUMA node 2 on the computing node 1 meets the requirements of the container 2, so the container 2 is migrated from the computing node 2 to the computing node 1 and is allocated with resources from NUMA node 2.

Figure 13:
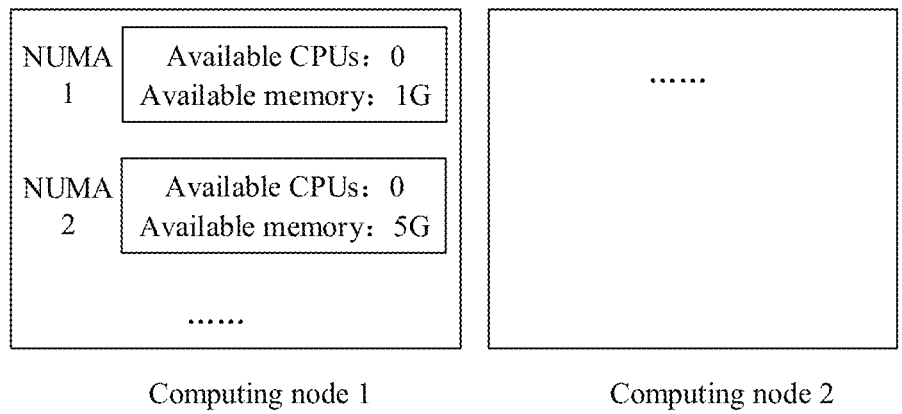

After that, resource utilization condition of the two computing nodes is shown in FIG. 13. At this time, the container 1 is allocated with resources from NUMA node 1 in the dedicated mode, which consumes 1 CPU and 1G of memory on NUMA node 1, and the container 2 is allocated with resources from NUMA node 2 in the dedicated mode, which consumes 2 CPUs and 3G of memory on NUMA node 2, thereby fragmentation space can be reduced.

Figure 14:
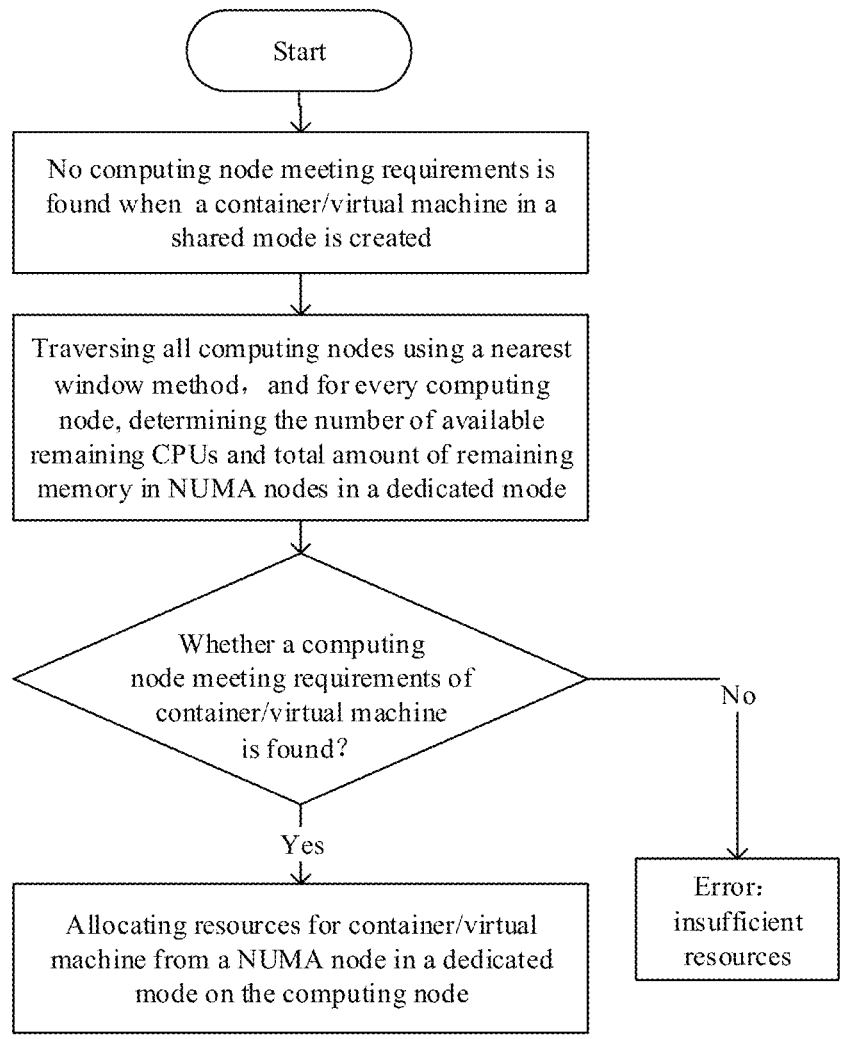
FIG. 14 is a flowchart showing a method for reducing excessive resource fragmentation caused by dedicated resource allocation according to another embodiment of the present disclosure.

FIG. 14 is a flowchart showing a method for reducing excessive resource fragmentation caused by dedicated resource allocation according to another embodiment of the present disclosure. In particular, the method for reducing resource fragmentation shown in FIG. 14 is proposed mainly for a situation where no computing node meeting the requirements is found. Details are provided as follows.

S1: If the container/virtual machine to be created is in the shared mode and no computing node meeting the requirements is found, the method goes to S2, otherwise a normal process follows so as to allocate resources for the container/virtual machine on a found computing node.

S2: All computing nodes are traversed by using the nearest window query method. For NUMA nodes in the dedicated mode on each computing node, $mem_i$ represents the amount of available memory of a NUMA node i, $cpu_i$ represents the number of available CPUs of the NUMA node i, and $\Sigma_t^n\ mem_t$ represents the total amount of available memories of NUMA nodes in the dedicated mode on the computing node, $\Sigma_t^n\ cpu_t$ represents the total number of available CPUs of the NUMA nodes in the dedicated mode on the computing node, and n is the number of NUMA nodes in the dedicated mode on the computing node. If a computing node is found to satisfy that $\Sigma_t^n\ mem_t$ is greater than memory required by the container/virtual machine and $\Sigma_t^n\ cpu_t$ is greater than the number of CPUs required by the container/virtual machine, the method goes to S3, otherwise it is considered that all computing nodes do not have enough available resources.

S3: The container/virtual machine is allocated with resources from NUMA nodes in the dedicated mode on a found computing node.

For example, on computing node 1, NUMA node 1 and NUMA node 2 are running containers/virtual machines in the dedicated mode. The number of available CPUs on NUMA node 1 is 2, available memory is 2G, and the number of available CPUs on NUMA node 2 is 2 and available memory is 4G. Now it is necessary to create a container in the shared mode, which requires 4 CPUs and 4G of memory. Assuming that no computing node meeting the requirements is found through the nearest window query method, the computing nodes are traversed again, and the number of available CPUs and the total amount of memories on the NUMA nodes in the dedicated mode are statistically determined. It is found that the total number of available CPUs of NUMA node 1 and NUMA node 2 on the computing node 1 is 4, and the total amount of available memories is 6G, which meets the requirements of the container. It is considered that the computing node 1 meets the requirements, and the container is allocated to the computing node 1 to attain resource allocation. After the allocation, NUMA node 1 provides 2 CPUs for the container, and NUMA node 2 provides 2 CPUs and 4G of memory for the container, thereby the fragmentation space is reduced.

It should be pointed out that the methods in FIGS. 11 and 14 are fragment optimization methods for different situations. Therefore, those skilled in the art can understand that the above methods can be used at the same time and will not cause conflicts.

The following is a specific example for description.

EXAMPLE 1

Assuming that the compute node 1 has two NUMA nodes, namely NUMA node 0 and NUMA node 1, each of which has 4 CPUs and 32G memory, and available disk space is 100G, and there are currently no containers or virtual machines. The container to be created requires 2 CPUs, 16G memory, 10G volume disk, and its computing resource utilization mode is a dedicated mode, and its connection network is net1.

After the cloud unified interface issues an instruction to create the container, the unified resource scheduling coordinator receives the instruction and acquires the requirements of the container, that is, 2 CPUs, 16G memory, 10G hard disk with the type of volume, connection network net1. The coordinator screens according to the information to find that the computing node 1 meets the requirements, and packages the information of the computing node 1 and the information of the container and transmits them to the container management module. The container management module finds that computing resources in NUMA node 0 on the computing node 1 meets the requirements of the container, and randomly selects 2 CPUs, assuming the number of selected CPUs are 0 and 1. The number 0 and number 1 are added to used CPUs of NUMA node 0, and its available memory minus 16G. Then storage resource information is transmitted to the storage management module, and the storage management module generates a 10G of volume, returns it to the container management module, and notifies the information to the unified resource scheduling coordinator. In the coordinator, available storage space of the computing node 1 is reduced by 10G. Then network information is transmitted to the container network agent module. The network agent module converts a network request of the container into an OpenStack neutron network request and transmits it to the network management module. The network management module assigns network resources such as appropriate IP address, MAC address, port or the like from net1 to the container management module. Based on these, the container management module completes creation of the container's network. After completion of the creation, CPU and memory consumption conditions of the container are notified to the unified resource scheduling coordinator, and the unified resource scheduling coordinator reduces the number of available CPUs of NUMA node 0 on the computing node 1 by 2 and the available memory by 16G.

EXAMPLE 2

Assuming that the compute node 1 has two NUMA nodes, namely NUMA node 0 and NUMA node 1, each of which has 4 CPUs and 32G memory, and available disk space is 100G, and there are currently no containers or virtual machines. The virtual machine to be created requires 6 CPUs, 16G memory, 10G local disk, and its computing resource utilization mode is the shared mode, and its connection network is net1.

After the cloud unified interface issues an instruction to create a virtual machine, the unified resource scheduling coordinator receives the instruction, and acquires requirements of the virtual machine from the instruction, that is 6 CPUs, 16G memory, 10G hard disk with the type of local storage, and connection network net1. The coordinator screens according to the information, and finds that the computing node 1 meets the requirements, and packages the information of the computing node 1 and the information of the virtual machine and transmits them to the virtual machine management module. The virtual machine management module finds that computing resources in NUMA node 0 and NUMA node 1 on the computing node 1 meet the requirements of the virtual machine, and randomly selects 6 CPUs, assuming that the numbers of selected CPUs are 0, 1, 2, 3, 6, 7. The numbers 0, 1, 2, and 3 are added to used CPUs of NUMA node 0, its available memory is subtracted by 16G; and the numbers 6 and 7 are added to used CPUs of NUMA node 1. Then the libvirt driver is invoked to acquire 10G local disk space. Then network information is transmitted to the network management module, and the network management module allocates network resources such as appropriate IP address, MAC address, port or the like from net1 to the virtual machine management module. The virtual machine management module completes creation of the virtual machine based on the resources obtained above, and notifies resource consumption information to the unified resource scheduling coordinator. The unified resource scheduling coordinator reduces the number of available CPUs of NUMA node 0 on the computing node 1 by 4, and the available memory by 16G the number of available CPUs on NUMA node 1 by 2, and the available disk space on the compute node 1 by 10G.

EXAMPLE 3

Assuming that compute node 1 has two NUMA nodes, namely NUMA node 0 and NUMA node 1, each of which has 4 CPUs and 32G memory, and available disk space is 60G, the number of available CPUs of NUMA node 0 is 3 and its available memory is 18G, and the number of available CPUs of NUMA node 1 is 2 and its available memory is 16G. There is a container and a virtual machine on the computing node 1, and the container is allocated with computing resources from NUMA node 0, and its resource utilization mode is the dedicated mode. The virtual machine is allocated with computing resources from NUMA node 1, and its resource utilization mode is the shared mode. The computing node 2 has two NUMA nodes, namely NUMA node 0 and NUMA node 1, each of which has 4 CPUs and 32G memory, and the available disk space is 100G. There are currently no containers or virtual machines. The virtual machine to be created requires 3 CPUs, 40G memory, and 40G local disk, and its computing resource utilization mode is the shared mode, and its connection network is net1.

After the cloud unified interface issues an instruction to create a virtual machine, the unified resource scheduling coordinator receives the instruction and acquires requirements of the virtual machine, that is, 3 CPUs, 40G memory, 40G hard disk with the type of local storage, and connection network net1. The coordinator screens according to the information and finds that NUMA node 0 on computing node 1 is allocating computing resources to a container in the dedicated resource utilization mode, so it does not meet the requirements. NUMA node 1 does not have enough available CPUs to meet the requirements, so the compute node 1 also does not meet the requirements. The number of available CPUs of the two NUMA nodes on the compute node 2 is 8, which is greater than 3 required by the virtual machine, and the amount of available memory is 64G, which is greater than the 40G required by the virtual machine, and the available disk space is 60G which is greater than the 40G required by the virtual machine. The computing resources utilization mode of the virtual machine is the shared mode, so resources of two NUMA nodes can be used, and thus the computing node 2 meets the requirements. The unified resource scheduling coordinator will package the information of computing node 2 and the information of the virtual machine and transmit them to the virtual machine management module. The virtual machine management module finds that computing resources in NUMA node 0 and NUMA node 1 on the computing node 2 meet the requirements of the virtual machine, and randomly selects 3 CPUs, assuming the numbers of selected CPUs are 0, 1, 2. The numbers 0, 1, and 2 are added to used CPUs of the NUMA node 0, and 32G is subtracted from the available memory, and 8G is subtracted from the available memory of NUMA node 1. Then the libvirt driver is invoked to acquire a local disk space of 40G. Then network information is transmitted to the network management module, and the network management module allocates network resources such as appropriate IP address, MAC address, port and the like from net1 to the virtual machine management module. The virtual machine management module completes creation of the virtual machine based on the above-obtained resources, and notifies resource consumption information to the unified resource scheduling coordinator. The unified resource scheduling coordinator reduces the number of available CPUs of NUMA node 0 on the computing node 1 by 3 and the available memory by 32G, reduces available memory of NUMA node 1 by 8G, and reduces available disk space of the computing node 1 by 40G.

In summary, the present disclosure proposes a scheduler for integrated scheduling of computing resources for containers and virtual machines. The scheduler records physical resource conditions. The resources include CPU, memory and disk, and communicates with the container/virtual machine heterogeneous resource management on physical resources through a RESTful API. The agent deployed on physical resources by the container/virtual machine heterogeneous resource management encapsulates collected computing resources condition and resource allocation conditions in a Key-value format and transmits it to the scheduler by invoking the RESTful API of the scheduler. The scheduler encapsulates scheduling information in the key-value format and transmits to the container/virtual machine heterogeneous resource management by invoking a RESTful API of the container/virtual machine resource management. The information is compared with allocation information of the container/virtual machine heterogeneous resource management for verification. In addition, physical resource conditions obtained by statistical resource determination is executed on an appropriate physical node through scheduling containers/virtual machines using a scheduling algorithm, so as to realize an integrated scheduling of containers/virtual machines on the same physical resource pool.

The scheduler classifies resource utilization mode into two types, shared and dedicated, according to different ways that containers/virtual machines use computing resources. In the shared mode, the containers/virtual machines can use any CPU and memory on a physical node, while in the dedicated mode, the container/virtual machine are allocated with resources of CPUs and memories with a NUMA node as the smallest unit. When the scheduler performs scheduling tasks, it uses the NUMA node as a resource allocation unit to find a suitable physical node for a container/virtual machine according to the resource utilization mode. NUMA nodes occupied by a container/virtual machine in the dedicated mode will not be able to allocate resources to a container/virtual machine in the shared mode, and vice versa.

In a fast allocation scenario, the scheduler uses the nearest window query method to quickly find an available physical node. The nearby window query method is as follows: various resource information contained in the physical node is combined into a physical node model in a form of an architecture, and respective physical nodes are traversed by the scheduler in a form of a linear list, and the scheduler maintains a window of length K, that is, a section with the length K in the physical node list. Every time a node selection is required, a selection is made from this section. If there is a node that meets the requirements, assuming its number in the list is i, the node number i is returned and the window is moved backward, such that the window ranges from i+1 to i+k; if no node that meets the requirements is found in the window, the window is moved backward by K, and above traversing operation is repeated in a new window until a suitable node is found or it is traversed to a starting position of this selection. If a suitable node is found, the number of the node is returned. If it is traversed to the starting position of the selection, the boolean value False is returned.

When the number of NUMA nodes in the dedicated mode exceeds 50% and the average resource utilization rate of the NUMA nodes is less than 50%, it is considered that excessive resource fragmentation occurs due to dedicated resource allocation. In this case, the scheduler will convert 50% of containers/virtual machines in the shared mode to the dedicated mode, and re-schedule these containers/virtual machines, so that these containers/virtual machines are scheduled to NUMA nodes in the dedicated mode as much as possible, in order to make full use of computing resources.

Based on the above scheduler, the container/virtual machine resource management obtains NUMA topology information of a physical node by invoking a Linux kernel interface, numactl, and records mapping description and utilization of the NUMA topology information in a form of key-value. The scheduler realizes compatibly a binding mapping and a shared time multiplexing of CPUs, memory and virtualized resources through a dedicated and shared classification.

Based on the above scheduler, network allocation of resources for a container does not adopt a separate management method, but through a network proxy mapping, and is performed based on a conversion from a container network model to a virtual machine network model to realize the container accesses to a virtual machine network (such as OpenStack Neutron), thereby containers and virtual machines on a same network segment of a same tenant network can communicate with each other. The container network model is unified with the virtual machine network resource model after being mapped by the network agent, and thus network resources can be managed in a unified manner.

Based on the above scheduler, for local disk scheduling of a physical machine, resources for the container adopts a mounting mode where local storage is formatted into a file system by disk formatting, while the virtual machine adopts a block device mapping mode, thus reflecting an advantages of mounting of local disk of the container. For utilization of remote network storage, the storage management module is used for a unified management.

The above examples mainly illustrate the unified resource scheduling coordinator, the method for creating a virtual machine and/or a container, the unified resource scheduling system, and the computer storage medium of the present disclosure. Although only some of the specific embodiments of the present disclosure have been described, those skilled in the art should understand that the present invention can be implemented in many other forms without departing from its gist and scope. Therefore, the examples and implementations shown are regarded as illustrative rather than restrictive. The present disclosure may cover various modifications without departing from the spirit and scope of the present disclosure as defined by the appended claims.

What is claimed is:

1. A method for creating a virtual machine and/or a container through a unified resource scheduling coordinator, characterized in that the method comprises:
   receiving an instruction to create the virtual machine and/or the container, wherein the instruction comprises parameters of the virtual machine and/or the container;
   selecting a first computing node from physical nodes according to the parameters;
   transmitting the parameters and information of the first computing node to a virtual machine management module and/or a container management module depending on a type of creation, such that the virtual machine management module allocates resources for the virtual machine through a virtual machine management agent module on the first computing node and/or such that the container management module to allocate resources for the container through a container management agent module on the first computing node;
   receiving resource allocation condition from the virtual machine management module and/or the container management module after creation of the virtual machine and/or the container; and
   notifying the resource allocation condition to the container management module and/or the virtual machine management module after recording of resource change condition,
   wherein selecting the first computing node from physical nodes according to the parameters further comprising using a nearest window query method to select the first computing node that meets the requirements according to the resource requirements and the computing resource utilization mode of the virtual machine and/or the container.

2. The method according to claim 1, wherein the parameters of the virtual machine and/or the container comprises resource requirements and computing resource utilization mode of the virtual machine and/or the container.

3. The method according to claim 1, wherein using the nearest window query method to select the first computing node that meets the requirements according to the resource requirements and the computing resource usage modes of the virtual machine and/or the container comprises:
   setting a list where each of the physical nodes has a unique number in the list, wherein the physical node comprises one or more non-uniform memory access architecture NUMA nodes and available disk capacity, and the NUMA node comprises information of computing resources available to the node;
   acquiring a current position (i, i+k−1) of a window in the list, where i represents a starting position number of the window, k represents a length of the window, and (i, i+k−1) represents a group of physical nodes within the window from a number i to a number i+k;
   determining, with respect to physical nodes within the current position of the window, whether there is a node that meets requirements of the container and/or the virtual machine for physical resources;
   returning a number j of the node that meets the requirements and moving the window backward such that a new window becomes (j+1, j+k) if the node exists; and
   moving the window backward such that the new window is (i+k, i+2k−1) and determining whether i is within the new window if the node does not exist, and determining that all of the nodes do not meet the requirements if i is within the new window.

4. The method according to claim 1, wherein the method further comprises:
   determining that a proportion of the number of NUMA nodes in a dedicated mode is higher than a first threshold and a utilization rate of the NUMA nodes is lower than a second threshold;
   randomly selecting a certain number of NUMA nodes from NUMA nodes in a shared mode; and
   modifying resource utilization mode of containers and/or virtual machines that are allocated with resources from selected NUMA nodes to be the dedicated mode and performing rescheduling, wherein a proportion of the number of the selected NUMA nodes with respect to all of the NUMA nodes corresponds to a third threshold.

5. The method according to claim 4, wherein the first threshold, the second threshold, and the third threshold are all 50%.

6. The method according to claim 1, wherein the method further comprises:
traversing every computing node and statistically determining available resources of NUMA nodes in a dedicated mode on the computing node when no computing node that meets the requirements is found using the nearest window query method;
allocating an appropriate computing node according to the requirements of the virtual machine and/or the container to be created; and
performing rescheduling of resources on the appropriate computing node.

7. The method according to claim 1, wherein the allocated resources comprises computing resources, network resources and storage resources.

8. A unified resource scheduling coordinator, characterized in that the unified resource scheduling coordinator comprises:
a first reception unit configured to receive an instruction to create a virtual machine and/or a container, wherein the instruction comprises parameters of the virtual machine and/or the container;
a selection unit configured to select a first computing node from physical nodes according to the parameters;
a first transmission unit configured to transmit the parameters and information of the first computing node to a virtual machine management module and/or a container management module depending on a type of creation, such that the virtual machine management module allocates resources for the virtual machine through a virtual machine management agent module on the first computing node and/or such that the container management module to allocate resources for the container through a container management agent module on the first computing node;
a second reception unit configured to receive resource allocation condition from the virtual machine management module and/or the container management module after creation of the virtual machine and/or the container; and
a notification unit configured to notify the resource allocation condition to the container management module and/or the virtual machine management module after recording of resource change condition,
wherein the selection unit is configured to use a nearest window query method to select the first computing node that meets the requirements according to the resource requirements and the computing resource utilization mode of the virtual machine and/or the container.

9. The unified resource scheduling coordinator according to claim 8, wherein the parameters of the virtual machine and/or the container comprises resource requirements and computing resource utilization mode of the virtual machine and/or the container.

10. The unified resource scheduling coordinator according to claim 8, wherein the selection unit comprises:
a storage subunit configured to store a list where each of the physical nodes has a unique number in the list, wherein the physical node comprises one or more non-uniform memory access architecture NUMA nodes and available disk capacity, and the NUMA node comprises information of computing resources available to the node, and to acquire a current position (i, i+k−1) of a window in the list, wherein i represents a starting position number of the window, k represents a length of the window, and (i, i+k−1) represents a group of physical nodes within the window from a number i to a number i+k;
a determination subunit configured to determine, with respect to physical nodes within the current position of the window, whether there is a node that meets the requirements of the container and/or the virtual machine for physical resources; and
a processing subunit configured to return a number j of the node that meets the requirements and move the window backward such that a new window becomes (j+1, j+k) if the node exists, and move the window backward such that the new window is (i+k, i+2k−1) and determine whether i is in the new window if the node does not exist, and to determine that all of the nodes do not meet the requirements if i is within the new window.

11. The unified resource scheduling coordinator according to claim 8, wherein the unified resource scheduling coordinator further comprises:
a determining unit configured to determine that a proportion of the number of NUMA nodes in a dedicated mode is higher than a first threshold and a utilization rate of the NUMA nodes is lower than a second threshold; and
a modification unit configured to randomly select a certain number of NUMA nodes from NUMA nodes in a shared mode, and modify resource utilization mode of containers and/or virtual machines that are allocated with resources from selected NUMA nodes to be the dedicated mode and perform rescheduling, wherein a proportion of the number of the selected NUMA nodes with respect to all of the NUMA nodes corresponds to a third threshold.

12. The unified resource scheduling coordinator according to claim 11, wherein the first threshold, the second threshold, and the third threshold are all 50%.

13. The unified resource scheduling coordinator according to claim 8, wherein the unified resource scheduling coordinator further comprises:
a traversing and determination unit configured to traverse every computing node and statistically determine available resources of NUMA nodes in a dedicated mode on the computing node when no computing node that meets the requirements is found using the nearest window query method;
an allocation unit configured to allocate an appropriate computing node according to the requirements of the virtual machine and/or the container to be created; and
a scheduling unit configured to perform rescheduling of resources on the appropriate computing node.

14. The unified resource scheduling coordinator according to claim 8, wherein the allocated resources comprises computing resources, network resources and storage resources.

15. A unified resource scheduling system, comprising the unified resource scheduling coordinator according to claim 8.

16. The system according to claim 15, wherein the system further comprises:
a container management module configured to allocate CPU and memory resources to the container.

17. The system according to claim 15, wherein the system further comprises:
a container network proxy module configured to receive a network resource request from the container management module, modify a requested resource model from a container network model to a first network model, forward a modified network resource request including the first network model, and finally acquire network resources, wherein the first network model is an Openstack neutron network model.

\* \* \* \* \*